Jan. 11, 1949.  W. W. GENTRY  2,459,022
CONVERTIBLE TRUCK BODY
Filed Aug. 13, 1947
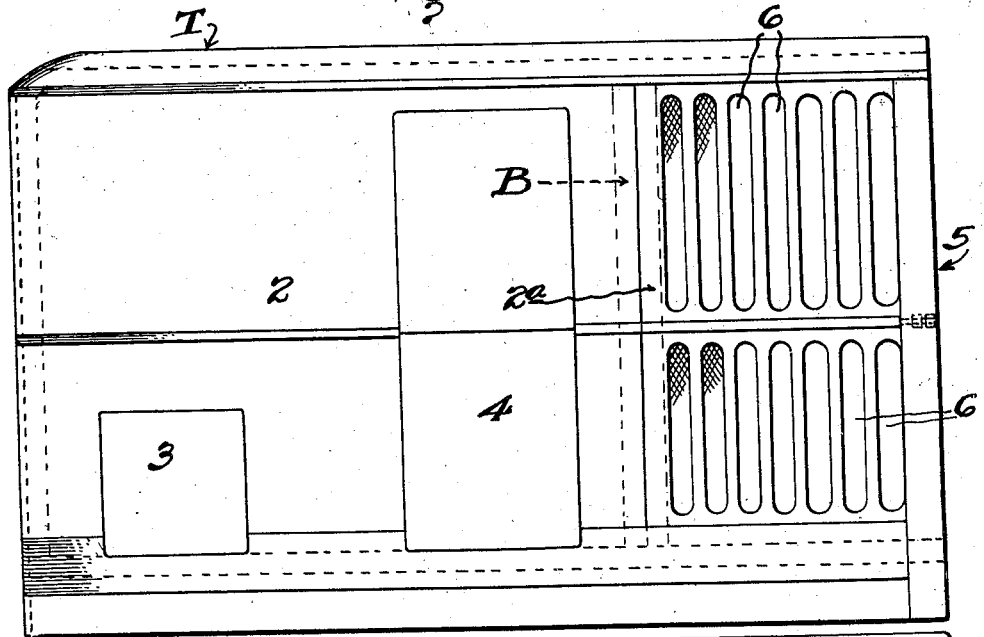
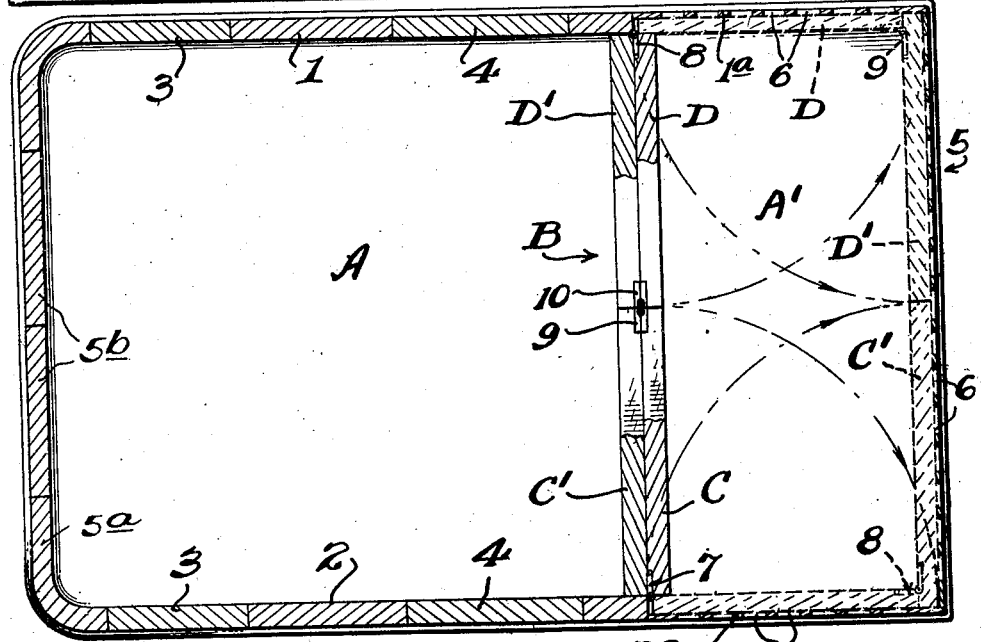
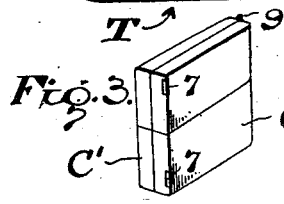
INVENTOR
William W. Gentry.

Patented Jan. 11, 1949

2,459,022

UNITED STATES PATENT OFFICE 2,459,022

CONVERTIBLE TRUCK BODY

William W. Gentry, Chickasha, Okla.

Application August 13, 1947, Serial No. 768,312

6 Claims. (Cl. 296—24)

This invention relates to truck bodies, and more particularly to a compartmented body which is readily convertible to meet the requirements of one type of cargo, or to shipments of different types.

A distinctive object of the invention is to provide a truck body which may be useful, either as a refrigerated truck, or a truck having a closed refrigerated compartment and a ventilated compartment. For example, the invention provides a body construction which enables the trucker to use a portion of the body for carrying perishables which require refrigeration, or other protection, while at the same time, using another portion of the body for the carrying of livestock, poultry, or produce which does not require particular preservation from, or in fact should be open to, the atmosphere.

A further object of the invention is to provide novel means for quickly dividing the cargo space of the truck into one completely closed compartment, or one closed compartment and one ventilated compartment, thus making a single body readily available for duplex trucking operations.

A further object is to provide a novel truck body and a system of hinged door leaves which are easy to install and operate.

With the above and other objects in view, which will more readily appear as the nature of the invention is better understood, the same consists in the novel construction and combination of parts as hereinafter illustrated and claimed.

A preferred and practical embodiment of the invention is shown in the accompanying drawings, in which:

Figure 1 is a side elevation of the improved truck body.

Figure 2 is a horizontal section of the body shown in Figure 1 illustrating the doors or partitions in full lines to divide the cargo space of the body into two compartments; the dotted lines showing the doors in position to make one large compartment.

Figure 3 is a detail perspective view of the doors made in upper and lower sections.

Similar reference characters designate corresponding parts throughout the several figures of the drawing.

As will be observed from the drawings, the invention includes a truck body designated generally as T, which may be of any desired or approved construction, having the interior thereof divisible when desired into compartment A and A'.

The compartment A has side walls 1 and 2 provided with access doors 3 and 4 and the opposite end walls 5 and 5a. The end wall 5a may be provided with access doors 5b. The sections 1a and 2a of the side walls, and the adjacent end wall 5 embracing the compartment A', are provided with openings 6 to render same perforate or foraminous whereby the compartment A' may be opened to the atmosphere when desired.

The compartments A and A' are formed by a shiftable partition B located at a suitable point transversely of the interior, said partition comprising pairs of folding doors each including the main door leaves C and D and the secondary leaves C' and D'. The main door leaves C and D are hinged to the interior of the truck body by the hinges 7 and 8.

The inner edges of the door leaves C—C' and D—D' are connected by means of the hinges 9 and 10.

The door leaves each have a width equal to a radius which is one-half of the floor width of the truck body and also equal to the length of the compartment A'. Thus, when the pairs of doors, including the leaves C—C' and D—D', are arranged transversely of the interior of the body, they divide the cargo space into compartments A and A'. Under these circumstances, it will be seen that the compartment A is completely closed, while the compartment A' is open to the atmosphere, that is ventilated because of the openings 6.

When both pairs of doors are disposed transversely of the interior of the truck body, the leaves C—C' and D—D' are parallel with each other, and all doors together constitute the partition B.

When it is desired to convert the entire interior of the truck body into a closed cargo space, which may be refrigerated if desired, it is only necessary to move the pairs of doors, including leaves C—C' and D—D', toward the end wall 5 of the truck body in such a way that the leaves C and D will be disposed parallel to the ventilated side wall sections 1a and 2a of the compartment A', while the leaves C' and D' will flushly cover the inside of the end wall 5 of the truck body to cover the openings 6 provided therein. Thus, when the pairs of doors constituting the partition are moved from the full line position in Figure 2 to the dotted line position, it will be understood that the entire cargo space of the truck body is closed to the atmosphere. On the other hand, when it is desired to ship a combination cargo, that is one that must be protected from the atmosphere and one whose contact with the atmosphere is of no consequence or perhaps preferred, it is only necessary to bring the doors back from the dotted line position shown in Figure 2 to that shown in full lines.

Thus, it will be seen that simple manipulation of the doors provides a two-compartment truck body, one of which is closed and adapted for refrigeration, the other of which is open for ventilation, or, if desired, the entire interior may be made into a single closed compartment.

It will, of course, be understood that the side wall portions 1a and 2a and the end wall 5 of the compartment A' may be made of the slotted type shown, or of any other foraminous formation suitable for the purpose. Also, it is within the scope of the invention to make the end wall 5 imperforate or non-foraminous, while leaving the side wall sections 1a and 2a perforate, and simply use the main leaves C and D to form the partition when said leaves are projected across the floor, or when the said leaves C and D are moved against the inner faces of the perforate side wall portions 1a and 2a, close said walls to the outside air. In other words, the omission of the secondary leaves C' and D' and leaving the end wall 5 solid, would not avoid the teaching of the present invention.

It will be understood that while the improvements set forth are described in connection with a truck body, nevertheless, they are equally applicable to a so-called trailer body. Also, it makes no difference whether the end wall 5 and the opposite end wall 5a are front or rear walls. In connection with the doors 5a it will be understood that they may be conventional full length doors or a conventional half door and tail gate combination.

The doors C—D and C'—D' may be solid full length doors or each door may consist of upper and lower sections, as per Figure 3, stripped in conventional fashion to insure air-tightness. Thus, with this arrangement, each pair of doors C—C' and D—D' may be swung back parallel to the sides 1a and 2a, respectively, and only the lower half of each door C'—D' moved parallel to the inside face of the end wall 5 leaving the upper half in vertical alinement with its related lower half. This would leave the upper half of the compartment A' open to the atmosphere and likewise open the compartment A. This arrangement would leave the entire cargo space open to the air and adapt the body to carry wheat, corn, or the like. This arrangement could of course be used with or without the door and tail gate arrangement described in connection with wall 5a. These and other changes may be resorted to without departing from the distinctive features set forth herein.

I claim:

1. A convertible truck body, comprising a floor, side, top and end walls, said floor, top and one of the end walls being relatively imperforate, and said side walls including perforate and imperforate sections, the latter adjoining a perforate end wall, and a partition located at the junction of the imperforate and perforate sections of said side walls, said partition comprising pairs of hingedly connected door leaves, one leaf of each pair respectively connected to opposite inner portions of the side walls between said perforate and imperforate sections, and movable from a folded position transversely across the interior of the truck body, which position divides said body into closed and ventilated compartments, to a relatively extended position whereby the leaves of each pair respectively lie behind the perforate sections of the side walls and the related portions of the perforated end wall to close all perforate portions of the body and provide a single enclosed compartment.

2. A convertible truck body comprising a floor, side, top and end walls, said floor, top and one of the end walls being relatively imperforate and said side walls including imperforate and perforate sections, the latter adjoining a perforate end wall, and a partition located within the body at the junction of the imperforate and perforate sections of said side walls, said partition comprising opposite pairs of main and secondary door leaves hingedly connected to each other at their inner edges to be disposed in aligned position to constitute a double walled partition transversely dividing the interior of the truck body into two compartments and hinge means connecting the main leaf of each door with the interior of the truck body at the junction of the imperforate and perforate sections of said side walls, whereby, when the main leaves are moved to a position to close the inner surface of the perforate side wall portions, the secondary leaves may be moved into position to close the inside face of the perforate end wall of the truck body.

3. A truck body having opposite end walls which are respectively imperforate and perforate, opposite side walls each having corresponding relatively imperforate and perforate sections, foldable multiple leaf doors hingedly connected at their inner ends, and one leaf of each unit hinged to the inner portions of the side walls at the junction of said imperforate and perforate sections thereof, said doors being swingable from a folded transverse position across the interior of the body providing two cargo compartments to an extended position wherein the leaves hinged to the body are parallel with the perforate sections of the side walls, and the remaining leaves lie behind the perforate end wall thereby to close all of said perforate portions to the atmosphere and provide a single closed cargo compartment.

4. A truck body having opposite end walls which are respectively imperforate and perforate, opposite side walls each having corresponding relatively imperforate and perforate sections, and a partition unit located at the junction of the imperforate and perforate sections of said side walls, said unit including opposite pairs of foldable hingedly connected leaves, one leaf of each pair hingedly connected to a side wall at the junction of the imperforate and perforate sections, and both pairs of leaves movable from aligned folded relation across the interior of the body into extended right angular relation whereby the leaves which are hinged to the side walls will close the perforate sections thereof and the leaves which are hinged to said first mentioned leaves will close the perforate end wall.

5. A truck body having opposite end walls which are respectively imperforate and perforate, opposite side walls each having corresponding relatively imperforate and perforate sections and a partition located at the junction of the imperforate and perforate sections of said side walls, said unit including opposite pairs of horizontally divided hingedly connected leaves, one leaf of each pair hingedly connected to a side wall at the junction of the imperforate and perforate sections of said side walls, and both leaves movable from aligned folded relation across the interior of the truck body to extended right angular relation selectively to close the perforate sections of said side walls and close the lower half of the perforate end wall.

6. A truck body, top, end and side walls, said side walls having imperforate and perforate sections, the latter being adjacent one end wall, a pair of doors each hinged at one edge to the inner part of a side wall at the junction of the imperforate and perforate sections thereof, said doors when aligned across the interior of the truck body forming two compartments, one of which is closed and the other of which is open to the atmosphere through said perforate sections, said doors when swung out of alignment and parallel to the inside face of said perforate sections forming a single compartment closed to the atmosphere.

WILLIAM W. GENTRY.

REFERENCES CITED

The following references are of record in the file of this patent:

UNITED STATES PATENTS

| Number | Name | Date |
| --- | --- | --- |
| 1,664,438 | Vetter | Apr. 3, 1928 |
| 1,994,150 | Stewart | Mar. 12, 1935 |
| 2,328,529 | O'Connor | Aug. 31, 1943 |